March 22, 1927.
F. M. MULLIGAN
FIGURE WHEEL WALKING TOY
Filed April 3, 1926
1,621,996
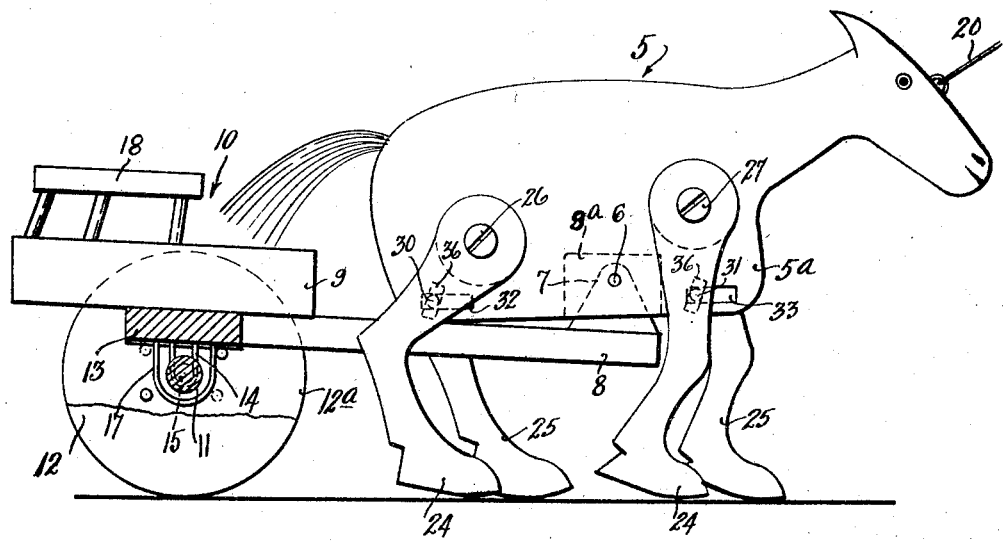
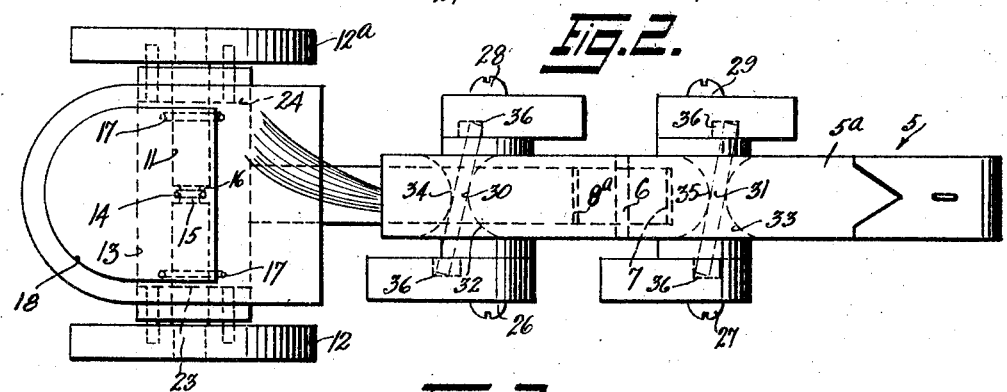
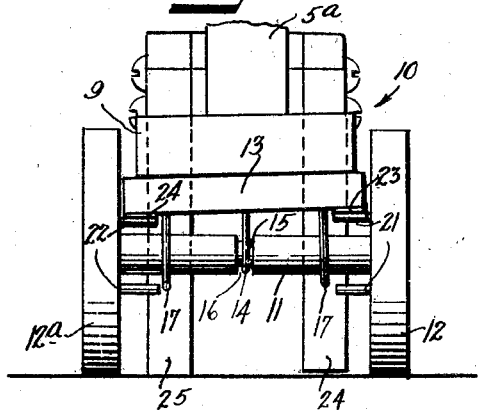
INVENTOR
Francis M. Mulligan
BY
Maurice Block
ATTORNEY Patented Mar. 22, 1927.

1,621,996

UNITED STATES PATENT OFFICE.

FRANCIS M. MULLIGAN, OF BUTTE, MONTANA.

FIGURE WHEEL WALKING TOY.

Application filed April 3, 1926. Serial No. 99,462.

This invention relates to improvements in figure toys, and more particularly to toys constructed to simulate the natural movements of animals when the toy is drawn across the ground or other surface.

The main object of the invention being the provision of a toy of this character that will simulate the natural movements of an animal drawn cart that will amuse children.

In the present instance, I have shown my invention incorporated in a four legged animal, such as a horse, but 1 do not restrict myself to the simulation of such an animal, as the invention may be incorporated just as readily in a two legged animal.

This invention also consists in certain details of construction and arrangement of parts as will be hereinafter fully described and claimed.

In the drawings, forming a part of this specification,

Figure 1 is a side view in elevation of one embodiment of my invention.

Fig. 2 is a top plan view of same and

Fig. 3 is a partial rear view of my toy showing the cart or wagon mounting.

Referring to the drawings in detail, 5 indicates the figure of a horse pivotally secured by means of a pin 6 passing through the body $5^a$ of the horse to an ear or projection 7 on a cart shaft 8 operating in an opening or recess $8^a$ in the lower portion of the body $5^a$. The shaft 8 is secured to the base 9 of a cart 10 in any suitable manner as by gluing or otherwise, the cart 10 being rockingly mounted on a shaft 11 carrying ground engaging wheels 12 and $12^a$. The base 9 has secured thereto a cross bar 13 having centrally located thereon a staple or wire loop 14 loosely engaging a reduced portion 15 of the shaft 11 formed by a groove 16 centrally located on the said shaft. Wire loops or staples 17 secured to the cross bar 13 form loose end bearings for the shaft 11. A seat 18 is provided at the rear of the base 9 upon which a figure of a man (not shown) may be suitably mounted. When the toy is drawn along the ground by means of a cord 20 secured to the head of the animal, forward motion will be imparted to the wheels 12 and $12^a$ having pins 21 and 22 extending inwardly and alternately engaging the underside of metal bearing plates 23 and 24 on the cross bar 13 to sway or rock the cart or vehicle 10 laterally from one side to the other, with the staple 14 acting as a fulcrum or pivot point and the staples 17 acting as limiting means for such swaying or rocking. This swaying or rocking motion will be imparted to the animal 5 causing the legs 24 and 25 pivoted to the body $5^a$ at 26, 27, 28 and 29 to alternately engage the ground. Each leg 24 is connected to a complementary leg 25 on the opposite side of the animal, by pins 30 and 31 pivotally journaled in slots or tapering openings 32 and 33 at the front and rear of the lower portion of the body $5^a$. The said slots 32 and 33 are so constructed as to provide pivot or fulcrum points 34 and 35 for the pins 30 and 31. If we assume that the legs 25 are in engagement with the ground due to the dipping of the body of the vehicle towards the left looking at Fig. 3, then the ground will act as a resistance to the said legs 25 causing the pins 30 and 31 to rock about their fulcrum and advance the legs 24 which are slightly above the ground until the end of the stroke, when the cart body and animal will be rocked by a pin 22 to the right and bring the legs 24 in contact with the ground and actuate the legs 25 forwardly, to simulate the natural walking movement of the animal. The pivot 6 will cause the animal to have forward and rearward sway every time the toe and heel portions of the foot contact the ground or when the toy is suddenly pulled forwardly. Slots 36 in the legs allow an up and down movement of the said legs in relation to the pins 30 and 31.

From the foregoing it will be seen that I have provided a toy, that when drawn along the ground, will cause the animal to simulate the natural gait thereof and will give amusement to children.

Having described my invention what I claim as new is:

1. A toy of the nature described, comprising ground engaging wheels, a vehicle pivotally associated with said wheels, pins on said wheels cooperating with the vehicle to alternately rock the body of the vehicle in opposite directions on said pivot, a figure at the front of the toy associated with the vehicle and means associated with the figure and vehicle to transmit the rocking motion from the vehicle to the figure.

2. In a toy, a vehicle, a figure pivotally associated with the vehicle, said figure being adapted for forward and rearward rocking on said pivot, a pair of wheels pivotally associated with the vehicle, pins on the wheels cooperating with the vehicle to alternately rock the body of the vehicle laterally from one side to the other, a shaft on the vehicle associated with the figure to transmit the rocking motion from the vehicle to the figure, pairs of legs pivoted on the figure and pins pivoted in tapering openings of the figure to alternately actuate the legs on one side of the figure and then the legs on the other side to simulate a walking movement.

3. A toy of the class described comprising a figure representing an animal, an axle, a pair of ground engaging wheels mounted on the axle, a member representing a vehicle pivoted on said axle, a cross bar on the vehicle, the legs of the figure being pivotally attached thereto, means for causing the rearward movement of the leg on one side of the animal to move the opposite leg forwardly, pins on the wheels cooperating with the cross bar to cause a part of the vehicle to have rocking movement and means for transmitting this movement to the body of the animal to tilt the same so that one leg will be raised to permit the other leg to move it forwardly.

4. A device of the class described comprising a figure made in the form of an animal, means for pivotally connecting the legs of the animal to the body thereof, a rocking bar pivotally supported in a tapering opening in the body of the animal and having its ends engaging recesses in the legs so that the movement of one leg in one direction will cause the other leg to move in an opposite direction, a wheeled vehicle, means on the wheels and the vehicle body for rocking the body thereof as the device travels along and means for communicating the rocking movement of the body to the body of the animal for tilting the same to move first one leg of each pair and then the other off the surface upon which the device is traveling.

5. A toy of the nature described comprising an axle, a pair of ground engaging wheels supported on the extremities of said axle, a vehicle pivotally supported on said axle, pins on said wheels cooperating with the vehicle to alternatingly rock the vehicle body in opposite directions, means on the body associated with the axle to limit the rocking movement of the said vehicle in either direction, a figure on the front of the body, a shaft secured to the vehicle pivotally associated with the figure to transmit the said rocking movement to said figure, a pair of legs pivotally secured to the front of said figure, a pair of legs similarly secured at the rear of said figure and pins pivotally mounted in tapering openings at the lower front and rear portions of the figure associated with the said legs to actuate the said legs to simulate a walking movement.

FRANCIS M. MULLIGAN.